(12) United States Patent
Park (10) Patent No.: US 8,082,804 B2
(45) Date of Patent: *Dec. 27, 2011

(54) LOAD MEASURING TRANSDUCER USING INDUCED VOLTAGE FOR REDUCING MEASURING ERRORS AND LOAD MEASURING SYSTEM USING THE SAME

(76) Inventor: Heung Joon Park, Gyeonggi-do (KR)

( * ) Notice: Subject to any disclaimer, the term of this patent is extended or adjusted under 35 U.S.C. 154(b) by 243 days.

This patent is subject to a terminal disclaimer.

(21) Appl. No.: 12/505,339

(22) Filed: Jul. 17, 2009

(65) Prior Publication Data

US 2010/0313678 A1   Dec. 16, 2010

(30) Foreign Application Priority Data

Jun. 16, 2009  (KR) .................. 10-2009-0053594

(51) Int. Cl.
    *G01L 1/22*   (2006.01)
(52) U.S. Cl. ................................. 73/862.045
(58) Field of Classification Search ......... 73/862.041–862.046, 862.045
    See application file for complete search history.

(56) References Cited

U.S. PATENT DOCUMENTS

| | | | |
|---|---|---|---|
| 3,202,948 A | 8/1965 | Farrand | |
| 3,827,291 A | 8/1974 | McCalvey | |
| 4,521,685 A | 6/1985 | Rebman | |
| 4,572,006 A | 2/1986 | Wolfendale | |
| 4,649,759 A | 3/1987 | Lee | |
| 5,129,262 A | 7/1992 | White et al. | |
| 5,492,020 A | 2/1996 | Okada | |
| 5,497,668 A | 3/1996 | Okada | |
| 5,812,427 A * | 9/1998 | Nonoyama et al. | 702/141 |
| 6,073,484 A * | 6/2000 | Miller et al. | 73/105 |
| 6,557,414 B2 * | 5/2003 | Sakurai et al. | 73/504.04 |
| 6,705,166 B2 | 3/2004 | Leonardson | |
| 6,736,008 B2 * | 5/2004 | Kumagai et al. | 73/504.14 |
| 6,792,805 B2 * | 9/2004 | Murata et al. | 73/514.32 |
| 7,690,270 B1 * | 4/2010 | Park | 73/862.045 |

FOREIGN PATENT DOCUMENTS

| | | |
|---|---|---|
| JP | 60-147616 A | 8/1985 |
| JP | 63-042436 A | 2/1988 |
| JP | 02-278119 A | 11/1990 |
| JP | 3046959 A | 2/1991 |
| JP | 04021831 A | 1/1992 |
| JP | 04-039551 A | 2/1992 |
| JP | 04-141907 A | 5/1992 |
| JP | 06-147958 A | 5/1994 |
| JP | 06-174535 A | 6/1994 |
| JP | 07-094962 A | 4/1995 |
| JP | 07-113587 A | 5/1995 |
| JP | 07-139991 A | 6/1995 |
| JP | 08-320124 A | 12/1996 |
| JP | 10-227685 A | 8/1998 |
| JP | 11-223507 A | 8/1999 |
| JP | 2001-074405 A | 3/2001 |
| JP | 2001-255216 A | 9/2001 |
| JP | 2002-228516 A | 8/2002 |
| KR | 20050026167 A | 3/2005 |
| KR | 20050066577 A | 6/2005 |

\* cited by examiner

*Primary Examiner* — Max Noori (74) *Attorney, Agent, or Firm* — Edwards Wildman Palmer LLP; Kongsik Kim

(57) ABSTRACT

Load-measuring transducers utilizing induced-voltage measurement techniques are described. The wiring patterns of such transducers can be configured to reduce interference errors due to wiring patterns thereof.

9 Claims, 12 Drawing Sheets

[PRIOR ART]

LOAD MEASURING TRANSDUCER USING INDUCED VOLTAGE FOR REDUCING MEASURING ERRORS AND LOAD MEASURING SYSTEM USING THE SAME

CROSS-REFERENCE TO RELATED APPLICATIONS

This application claims the benefit of priority from Korean Patent Application No. 10-2009-0053594 filed on Jun. 16, 2009, which application is incorporated herein by reference in its entirety.

BACKGROUND OF THE INVENTION

1. Field of the Invention

The present invention relates to load measuring sensor gauges for measuring loads, as well as to load measuring systems using such sensor gauges. More particularly, the present invention relates to sensor gauges and systems, wherein load is applied to an elastically deformable structure to produce an elastic deformation in the structure. The applied load is then measured using an induced-voltage sensor gauge configured to detect an induced voltage corresponding to the produced elastic deformation.

2. Background of the Related Art

Typically, general-purpose electronic scales, industrial electronic scales and the like utilize so-called "electric resistance type load cells". Such load cells employ a strain gauge using resistive wire. In such load cells, when a strain is experienced by a structure due to application of load, the strain is detected as a change in electrical resistance of the resistive wire, and is then converted into an electrical signal that in-turn is measured, thereby enabling measurement of the applied load.

Currently, load cells with strain accuracy as high as between about 1/3,000 and 1/5,000 are generally available. It is very difficult to implement a load cell with accuracy higher than the above accuracy. This is because there are problems in that typically a layer of adhesive is used to attach a strain gauge to its supporting structure, and the adhesive can distort. Thus, strain produced in the structure is transferred, but extension and compression behavior of the structure is modified. Further, because the adhesive is made of polymer that has an inhomogeneous amorphous structure, the adhesive exhibits non-uniform mechanical properties that cannot be easily predicted.

Inherent features of typical strain gauges also adversely affect attaining higher accuracies. Particularly, a back plate which is typically made of a polymeric material such as phenol or polyamide, and which is placed below the resistive material of the strain gauge, inhibits the transfer of strain.

Further, because it is difficult to achieve a uniform profile of the resistive material throughout the strain gauge, it is also difficult to obtain uniform deformation thereof that is proportional to a compressive or tensile strain of a structure.

Another prior technique for measuring load uses an electromagnetic force balancing type load measuring transducer. However, since this load measuring transducer employs a very complicated mechanical mechanism, the load measuring transducer is difficult to manufacture and is very expensive. In addition, there are electrical and spatial limitations on increases of electromagnetic force, serving as balancing forces for applied loads. Further, since the complicated mechanical mechanism includes many thin hinges, there are problems in that it is not suitable for measurement of heavy loads and it is very vulnerable to external impacts.

Due to the above problems, such a load measuring transducer cannot easily be used in general-purpose commercial electronic scales or industrial electronic scales and only selectively used in special-purpose electronic scales.

To solve the above problems, related technologies are disclosed in Korean Patent Registration No. 10-0500736 and U.S. Pat. No. 7,258,028 B2.

Figure 6:
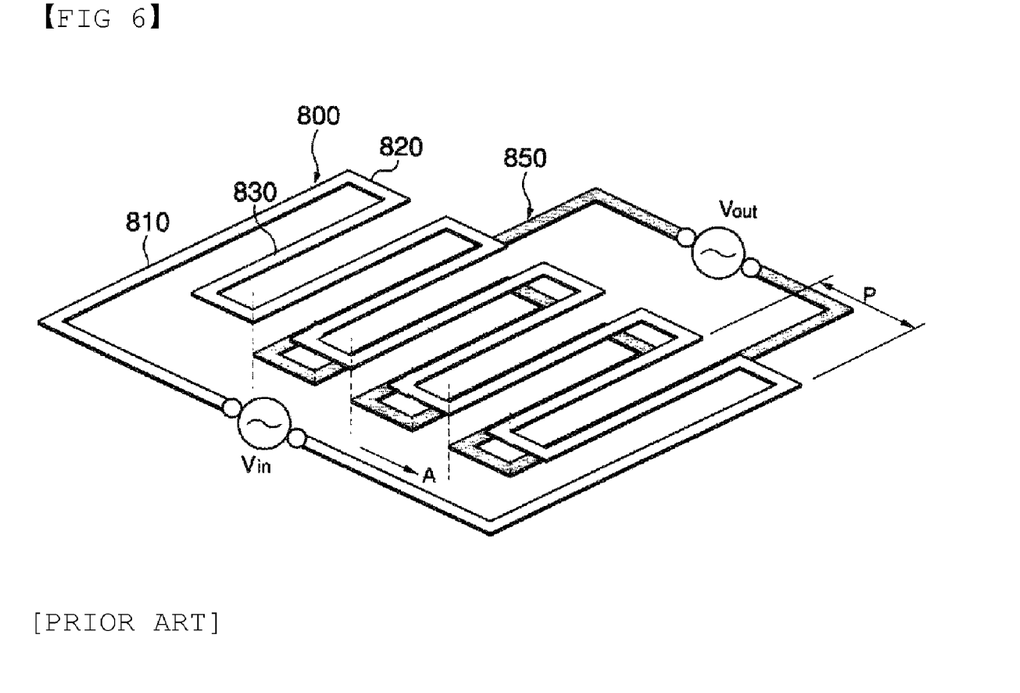
FIG. 6 is a schematic isometric view showing example gauges according to the prior art.

In the above-mentioned prior art, two gauges each having repeating electric wire patterns formed thereon are placed face-to-face with one another, and an Alternating Current (AC) voltage is measured, which is induced in one of the gauges by AC applied to the other of the gauges, thereby measuring load. A typical shape of such a wire pattern for such gauges is shown in FIG. 6.

In such devices, induced voltage is dependent on the relative position between the long, parallel electric wires of the electric wire patterns of adjacent gauges. However, the above prior art is problematic in that, as illustrated in FIG. 6, the short connecting electric wires, that are perpendicular to the longer wires of the electric wire patterns, influence the overall magnetic field of the device and cause measurement errors. In such prior art devices, in order to remedy that problem, the amount of voltage generated by the short electric wires must be theoretically calculated and corrections made to actual readings to compensate.

SUMMARY OF THE INVENTION

Accordingly, the present invention has been made in view of the above-described problems with conventional load measurement sensors and systems. An object of the present invention is to provide load measuring sensor gauges and a load measuring systems, which are capable of measuring loads with higher accuracy through more simplified structures and components.

Another object of the present invention is to conveniently avoid unnecessary error correction steps, and to increase measurement accuracy by eliminating errors caused by structural configurations that suffer from the aforementioned interference effects.

A load measuring transducer according to an embodiment of the present invention comprises a stationary gauge configured to have electric wire patterns with a predetermined pitch formed thereon, the wiring pattern repeating a predetermined number of times and both ends being configured and adapted to receive application of AC electricity, a stationary unit having the stationary gauge formed therein, a movable gauge configured to move in a longitudinal direction of the stationary gauge without coming into contact with the stationary gauge in response to elastic deformation exhibited by the deformation-producing portion and to have electric wire patterns with a predetermined pitch formed thereon by a predetermined number of times, and a movable unit having the movable gauge formed therein, wherein each of the electric wire patterns of the stationary gauge comprises a first portion configured to extend in a straight line on a first surface of the stationary unit, a second portion configured to extend from the first portion and penetrate the stationary unit, a third portion configured to extend from the second portion and provided on a second surface of the stationary unit in a direction perpendicular to the first portion, a fourth portion configured to extend from the third portion and penetrate the stationary unit, a fifth portion configured to extend from the fourth portion and provided in a straight line on the first surface of the stationary unit in parallel to the first portion, a sixth portion configured to extend from the fifth portion and penetrate the stationary unit, a seventh portion configured to extend from the sixth portion and provided on the second surface of the stationary unit in a direction perpendicular to the fifth portion, and an eighth portion configured to extend from the seventh portion and penetrate the stationary unit, and each of the electric wire patterns of the movable gauge comprises a first portion configured to extend in a straight line on a first surface of the movable unit, a second portion configured to extend from the first portion and penetrate the movable unit, a third portion configured to extend from the second portion and provided on a second surface of the movable unit in a direction perpendicular to the first portion, a fourth portion configured to extend from the third portion and penetrate the movable unit, a fifth portion configured to extend from the fourth portion and provided in a straight line on the first surface of the movable unit in parallel to the first portion, a sixth portion configured to extend from the fifth portion and penetrate the movable unit, a seventh portion configured to extend from the sixth portion and provided on the second surface of the movable unit in a direction perpendicular to the fifth portion, and an eighth portion configured to extend from the seventh portion and penetrate the movable unit.

The applied load is measured based on an amount of induced voltage measured from the movable gauge.

The third portion of the pattern is provided in a direction perpendicular to the first portion, the second portion, the fourth portion, and the fifth portion.

The seventh portion of the pattern is provided in a direction perpendicular to the first portion, the sixth portion, the eighth portion, and the fifth portion.

The electronic elements are coupled to the third portion or the seventh portion.

The movable gauge is movable within a range of ¼ of a pitch between the patterns of the stationary gauge.

The stationary unit or the movable unit is made of materials shielding an electric field.

A load measuring system according to an embodiment of the present invention comprises a load measuring transducer, comprising a stationary gauge configured to have electric wire patterns with a predetermined pitch formed thereon, the wire patterns repeating a predetermined number of times and both ends being configured and adapted to receive an application of AC electricity, a stationary unit having the stationary gauge formed therein, a movable gauge configured to move in a longitudinal direction of the stationary gauge without coming into contact with the stationary gauge in response to elastic deformation produced in the deformation-producing portion and to have electric wire patterns with a predetermined pitch formed thereon by a predetermined number of times, and a movable unit having the movable gauge formed therein; and a calculation unit calculating a magnitude of the applied load based on an amount of induced voltage output from the movable gauge of the transducer, wherein each of the electric wire patterns of the stationary gauge comprises a first portion configured to extend in a straight line on a first surface of the stationary unit, a second portion configured to extend from the first portion and penetrate the stationary unit, a third portion configured to extend from the second portion and provided on a second surface of the stationary unit in a direction perpendicular to the first portion, a fourth portion configured to extend from the third portion and penetrate the stationary unit, a fifth portion configured to extend from the fourth portion and provided in a straight line on the first surface of the stationary unit in parallel to the first portion, a sixth portion configured to extend from the fifth portion and penetrate the stationary unit, a seventh portion configured to extend from the sixth portion and provided on the second surface of the stationary unit in a direction perpendicular to the fifth portion, and an eighth portion configured to extend from the seventh portion and penetrate the stationary unit, and each of the electric wire patterns of the movable gauge comprises a first portion configured to extend in a straight line on a first surface of the movable unit, a second portion configured to extend from the first portion and penetrate the movable unit, a third portion configured to extend from the second portion and provided on a second surface of the movable unit in a direction perpendicular to the first portion, a fourth portion configured to extend from the third portion and penetrate the movable unit, a fifth portion configured to extend from the fourth portion and provided in a straight line on the first surface of the movable unit in parallel to the first portion, a sixth portion configured to extend from the fifth portion and penetrate the movable unit, a seventh portion configured to extend from the sixth portion and provided on the second surface of the movable unit in a direction perpendicular to the fifth portion, and an eighth portion configured to extend from the seventh portion and penetrate the movable unit.

BRIEF DESCRIPTION OF THE DRAWINGS

The objects and features of the present invention will become apparent from the following description of preferred embodiments, given in conjunction with the accompanying drawings, in which.

DETAILED DESCRIPTION

Hereinafter, select embodiments of the present invention will be described in detail with reference to the accompanying drawings.

Figure 1:
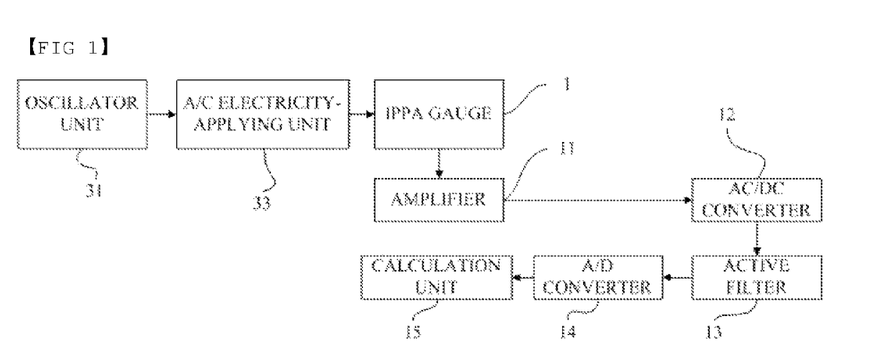
FIG. 1 is a block diagram of a load measuring system, suitable for use with gauges of the present invention.

FIG. 1 shows an example of a system for measuring load, suitable for use with a load measuring sensor gauge according to the present invention. As shown in FIG. 1, the load measuring system of the present invention comprises an oscillator unit 31, an AC electricity-applying unit 33, an IPPA gauge 1, an amplifier 11, an AC/DC converter 12, an active filter 13, an A/D converter 14, a calculation unit 15 and can include a display (not shown). The term "IPPA gauge" used herein is an acronym for "Inductance Pattern Analogue Gauge". In such gauges, AC is applied to one side (e.g. a stationary side) of the gauge. A voltage is induced in the other side of the gauge (e.g. the movable gauge), which varies with such movement. The induced voltage in the movable gauge is continuously measured, thereby measuring applied load in real time. Alternatively, the induced voltage can be measured after a lapse of a predetermined period of time in order to measure applied load instantaneously.

The oscillator unit 31 includes a high frequency oscillation circuit, and an AC signal generated by the oscillation unit 31 is applied to the AC electricity-applying unit 33 that in-turn amplifies the AC signal to have a predetermined level of voltage. The AC electricity-applying unit 33 applies the amplified AC signal to the IPPA gauge 1. With reference to FIGS. 3a-6, the IPPA gauge 1 comprises a stationary gauge 800 and a movable gauge 850 that can move without contact, with respect to the stationary gauge 800. The detailed structure of the IPPA gauge 1 will be described with reference to FIG. 6.

As shown in FIG. 6, the IPPA gauge 1 comprises a stationary gauge 800 and a movable gauge 850 that is arranged to move without contacting the stationary gauge 800, which arrangement is applicable to the specific wiring patterns of the invention. It is to be understood that the precise wiring patterns illustrated in FIGS. 1-6 are provided to simply illustrate implementation of the specific wiring patterns illustrated in FIGS. 7-10 and 12, described in more detail hereinbelow, the wiring pattern illustrated in detail in FIG. 6 itself, being considered prior art. In practice, a stationary gauge 800 and a movable gauge 850 are formed in respective stationary and movable units. The stationary unit and the movable unit are not shown in FIG. 6, for convenience of description. In practice, the stationary unit and the movable unit are formed on respective flat plates.

In the illustrated embodiment, each of the stationary and movable gauges 800 and 850 is formed with repeating wire patterns. Each pattern comprises a first portion 810 extending in a straight line, a second portion 820 extending laterally from the end of the first portion 810, and a third portion 830 extending laterally from the end of the second portion 820, and parallel to the first portion 810. The patterns are then repeated. Each of pattern-connecting portions extends from the third portion 830 in a direction perpendicular to the third portion 830 and connects the patterns. Each of the stationary and movable gauges 800 and 850 has a pitch P between adjacent patterns. Preferably, the pitches are substantially consistent across the entire pattern.

Here, accurate results can be obtained when measuring load with consideration taken of only voltage induced by the mutual movement of the first portion 810 and the third portion 830 (i.e., the horizontal portions of the stationary gauge 800 and the movable gauge 850). The mutually perpendicular second portion 820, etc., connecting the first portion 810 and the third portion 830, are required for functionality but cause changes in a magnetic field for the device, thereby hindering accurate load measurements.

In order to remove the occurrence of errors introduced by the perpendicular portions, the present invention provides new configurations for such devices. One embodiment is described with reference to FIGS. 7 to 10. FIGS. 7 to 10 illustrate embodiments in which laterally-extending portions prone to introduce errors, are separated from electric wire patterns that actively participate in induction within the IPPA gauge.

Figure 7:
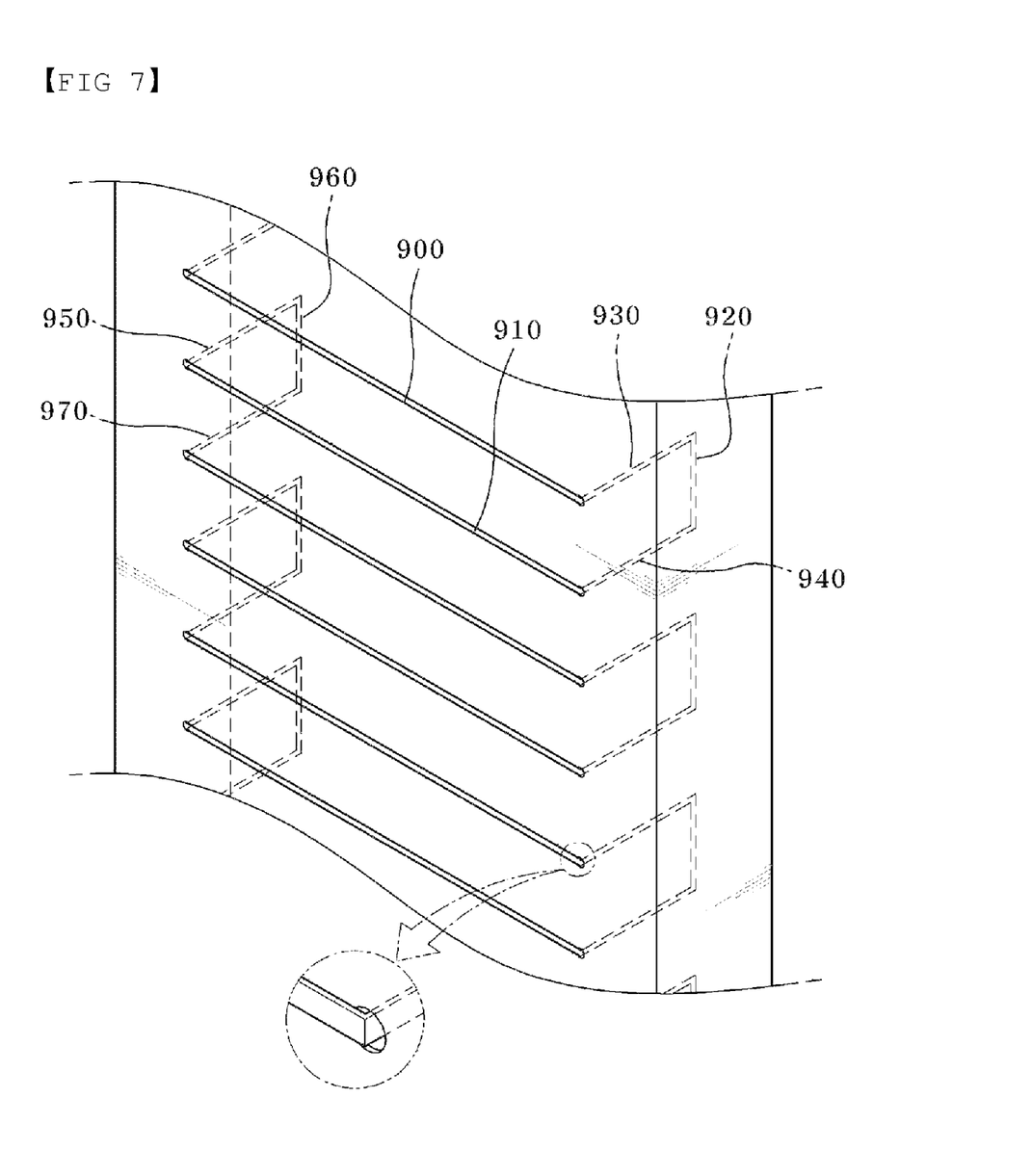
FIG. 7 is a partial perspective view showing a first surface of a member on which a gauge according to one embodiment of present invention is provided.
Figure 8:
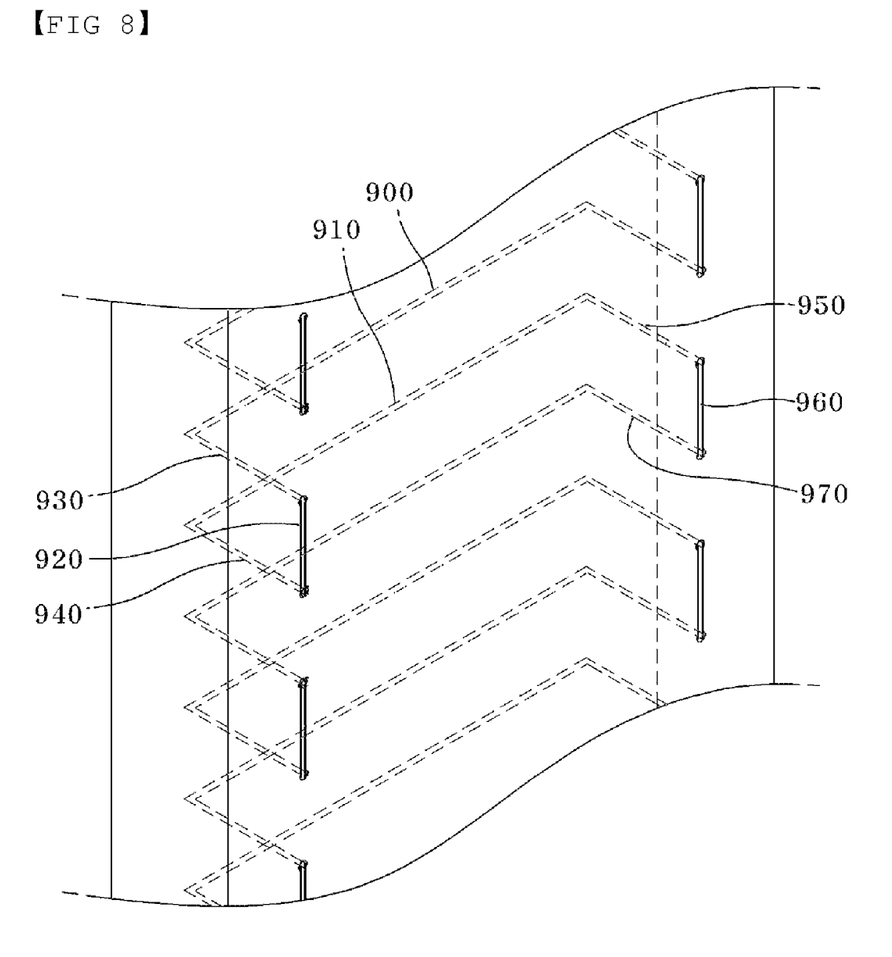
FIG. 8 is a partial perspective view showing a second surface of the member of FIG. 7, on which the gauge is provided.

A stationary gauge portion 800 is formed having repeated patterns. Each of the patterns of the stationary gauge portion comprises a first portion 900, a second portion 930, a third portion 920, a fourth portion 940, a fifth portion 910, a sixth portion 950, a seventh portion 960, an eighth portion 970, and so on. The first portion 900 extends in a straight line on a first surface of a stationary unit. The second portion 930 extends from the first portion 900 and penetrates the stationary unit. The third portion 920 extends from the second portion 930 along the second surface of the stationary unit, in a direction perpendicular to the first portion 900. The fourth portion 940 extends from the third portion 920 and penetrates the stationary unit. The fifth portion 910 extends from the fourth portion 940 and provided in a straight line on the first surface of the stationary unit, in parallel to the first portion 900. The sixth portion 950 extends from the fifth portion 910 and penetrates the stationary unit. The seventh portion 960 extends from the sixth portion 950 and extends along the second surface of the stationary unit in a direction perpendicular to the fifth portion 910. The eighth portion 970 extends from the seventh portion 960 and penetrates the stationary unit. Here, the eighth portion 970 corresponds to the above-mentioned pattern-connecting portions.

Preferably, the stationary unit is a generally flat plate, but need not be limited thereto. Furthermore, if the stationary unit is formed from a material capable of shielding a magnetic field, the second portion 930, the fourth portion 940, the sixth portion 950, and the eighth portion 970, extending in a thickness direction of (e.g., through) the stationary unit, and the third portion 920 and the seventh portion 960, extending along the second (i.e. "back") surface of the stationary unit, do not have any influence on changes in the magnetic or electric fields affecting the electric wires of a movable gauge. Accordingly, accuracy in load measurement can be further improved because those portions producing errors are effectively eliminated.

The wiring patterns of the movable gauge 850 are substantially the same as those of the stationary gauge 800, and a description thereof is therefore omitted. The movable unit is also substantially the same as the stationary unit, and a description thereof is therefore also omitted.

Figure 10:
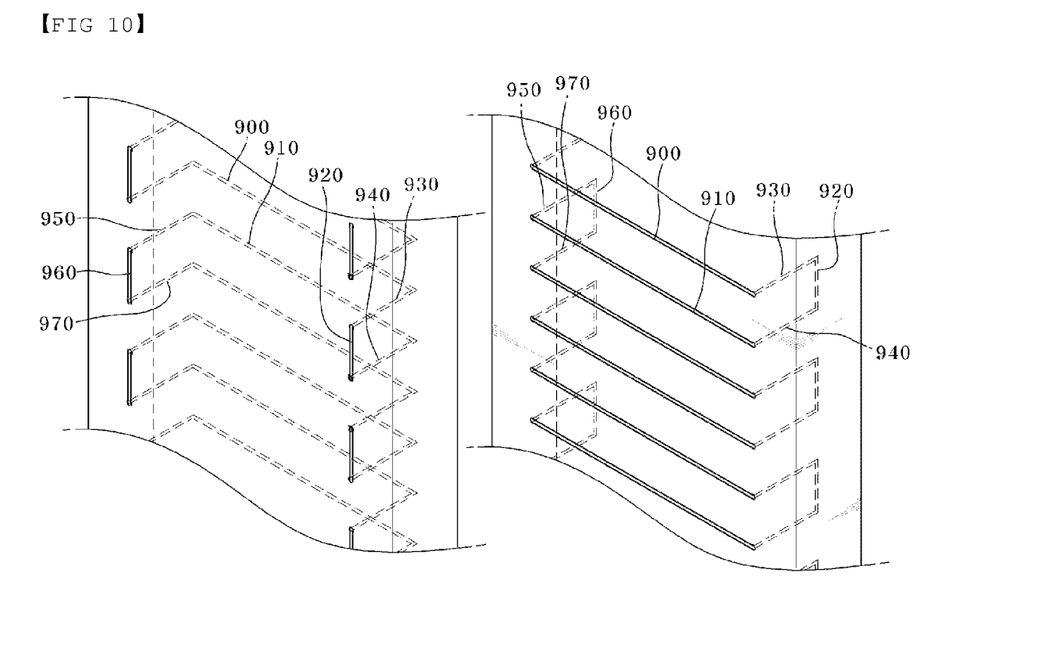
FIG. 10 is a partial perspective view of an inductance pattern analogue ("IPPA") gauge according to the present invention, illustrating two members, used in conjunction with one another.

FIG. 10 illustrates the mutual arrangement of a stationary gauge 800 and a movable gauge 850. The first portion 900 and the fifth portion 930 of the stationary gauge 800 are placed to face the first portion 900 and the fifth portion 930 of the movable gauge 850. Accordingly, the remaining portions (e.g., second through fourth and sixth through eighth portions) of the electric wire patterns do not have any influence on an electromagnetic induction phenomenon.

Figure 9:
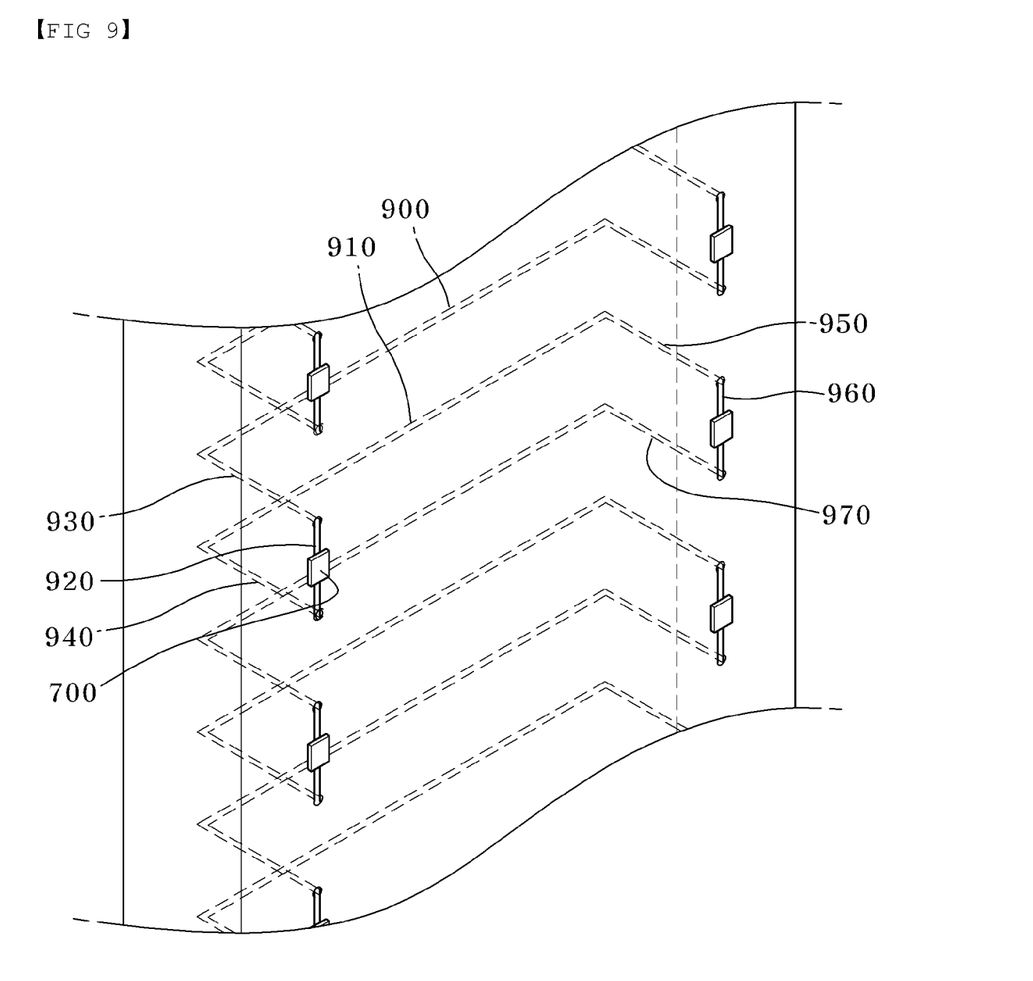
FIG. 9 is a partial perspective view showing the second surface of a member, on which a gauge according to another embodiment of the present invention is provided, the gauge having circuit elements provided thereon.

As illustrated in FIG. 9, electronic elements 700, such as a condenser, a resistor, an inductor, and a diode may be included in a third portion 920 and a seventh portion 960, provided on the second surface of each of a stationary unit and a movable unit, of the stationary gauge 800 and the movable gauge 850, respectively. In this specification, the term 'electronic elements' refers to components which may have an effect on current and voltage of circuits and thus may include condensers, resistors, inductors, and diodes, for example. The electronic elements 700 can be provided to compensate for portions producing errors, other than the first portion 900 and the fifth portion 930, of the electric wire patterns.

As described above, the present invention describes certain wiring pattern shapes of stationary and movable gauges 800, 850 configured to eliminate errors resulting from interference effects of connecting portions.

Figure 12:
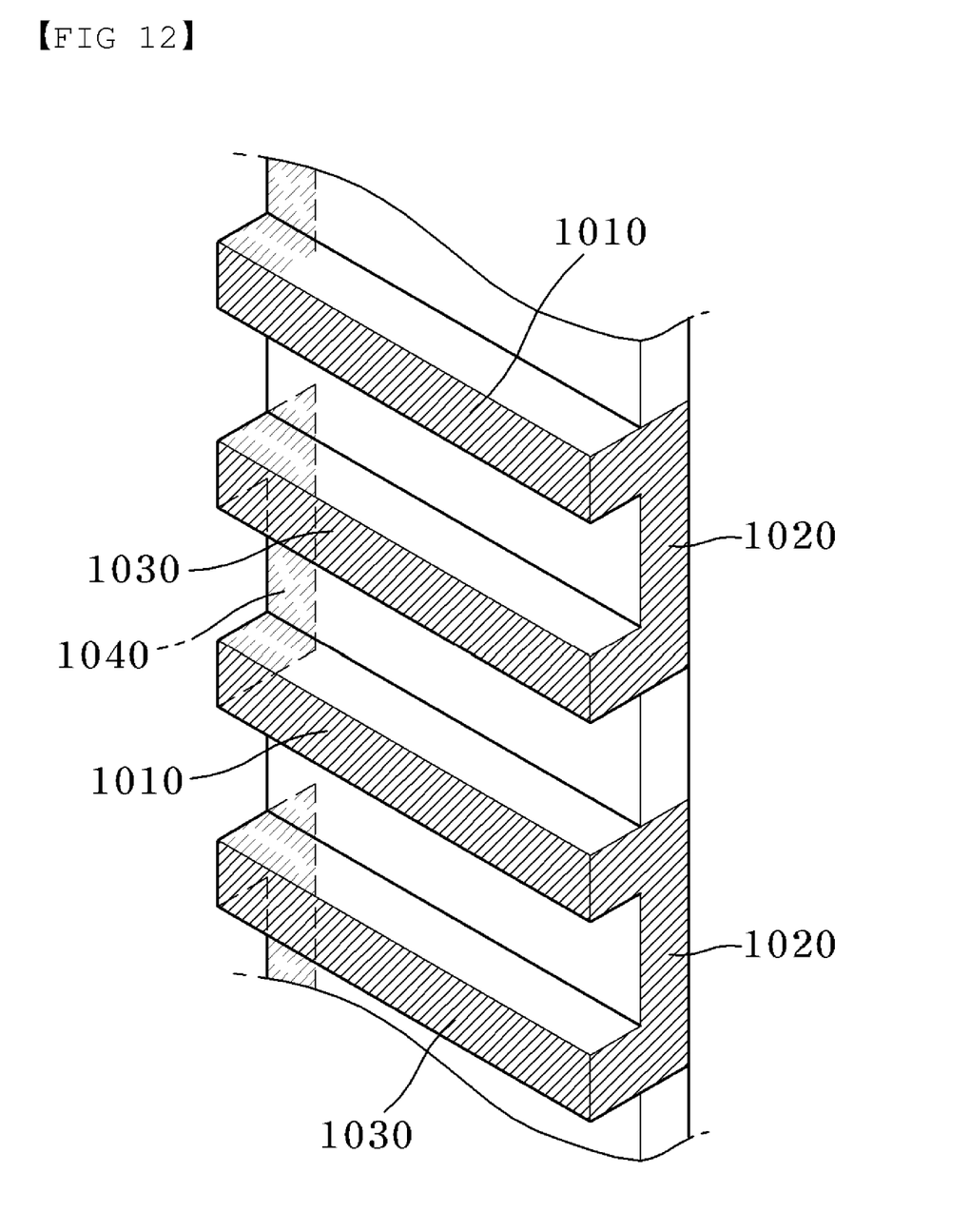
FIG. 12 is a partial perspective view showing a further embodiment of an IPPA gauge according to the present invention.
Figure 13:
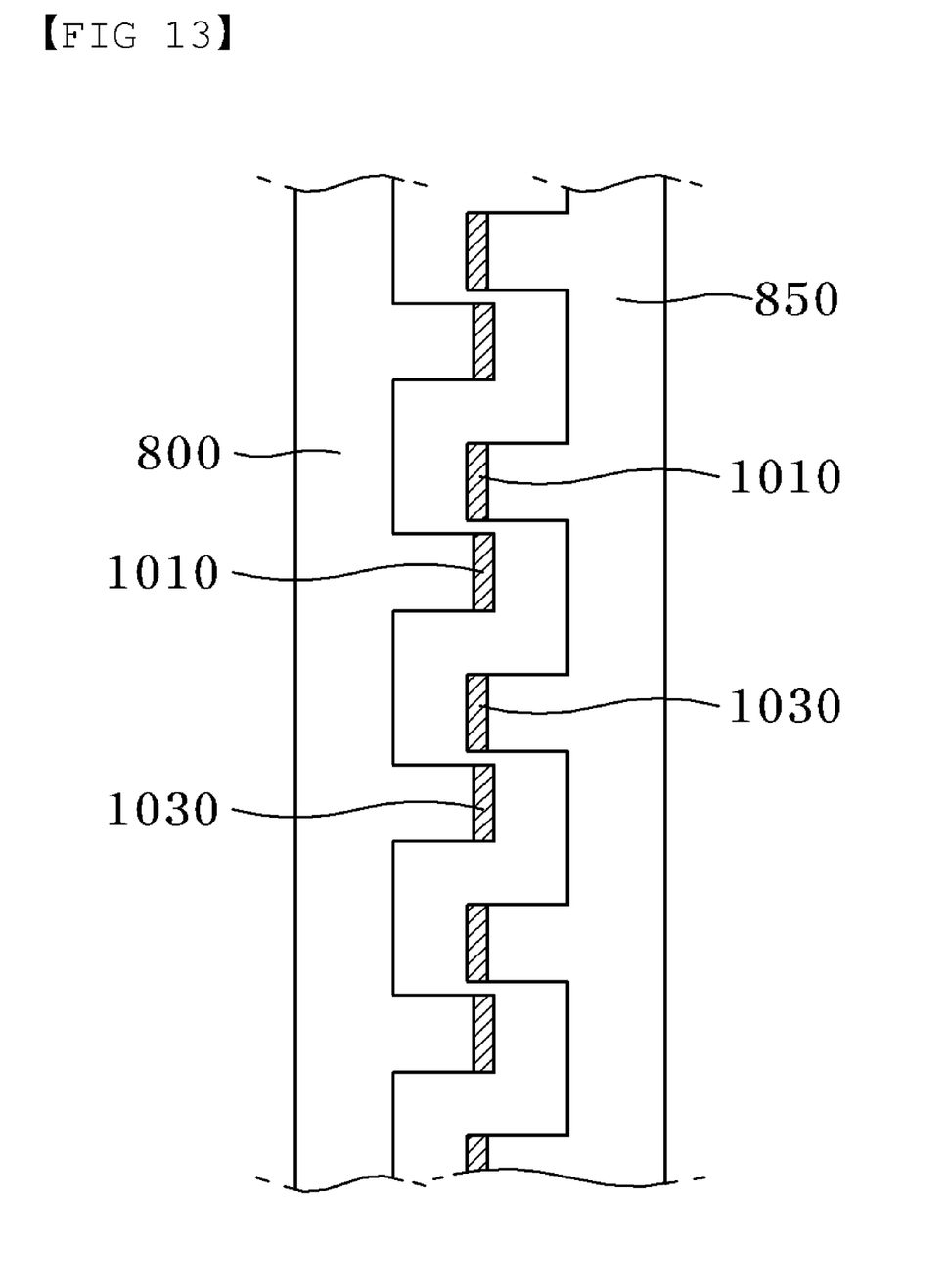
FIG. 13 is a sectional view showing the embodiment of an IPPA gauge according to FIG. 12.
Figure 14:
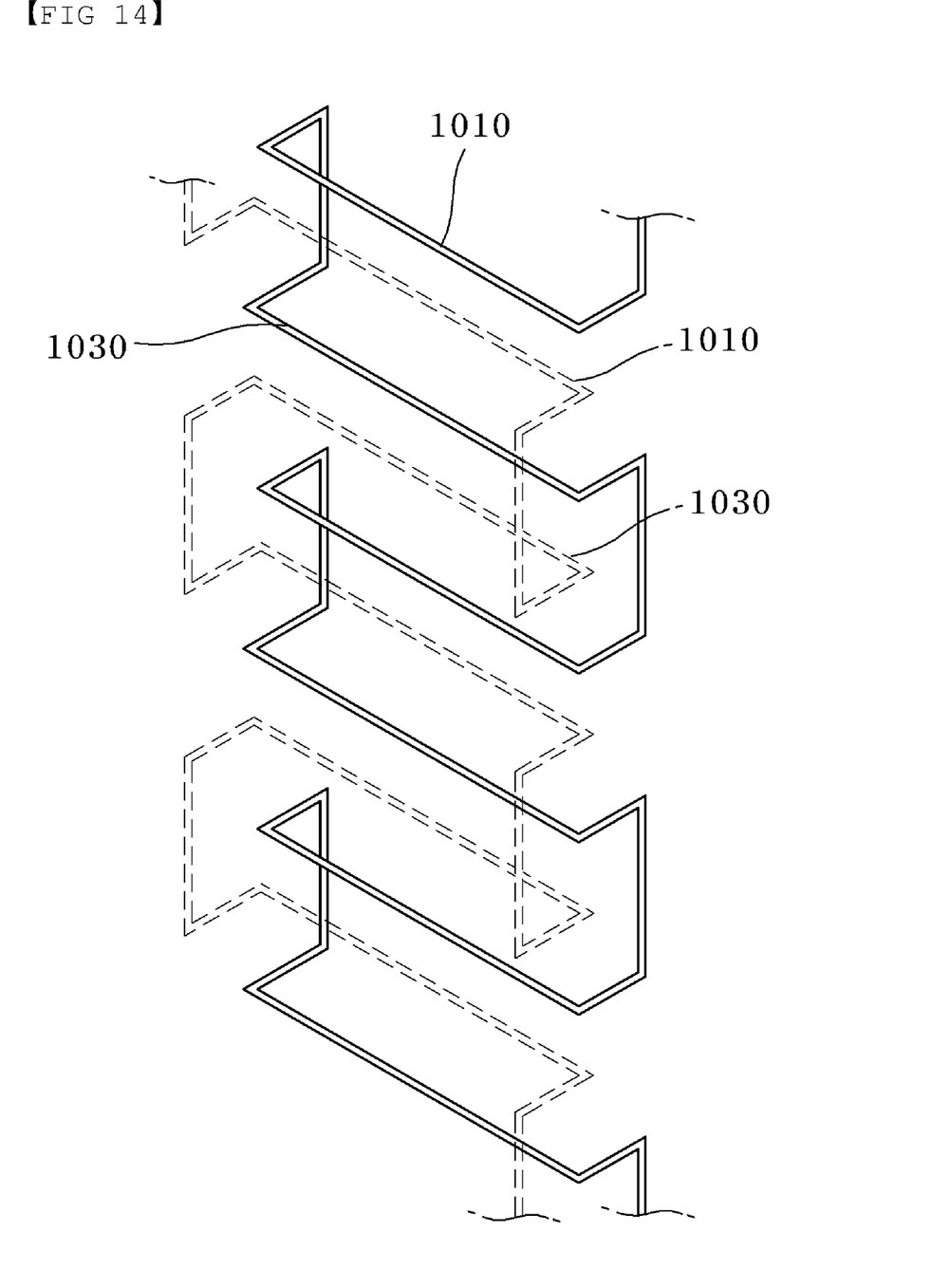
FIG. 14 is a conceptual view showing only the electrical conductors of FIG. 13.

Furthermore, another embodiment for eliminating an interference effect between connecting portions according to the present invention is illustrated in FIGS. 12 to 14. Portions thereof, on which a first portion 1010 and a third portion 1030 are respectively formed, protrude from one side of a respective stationary or movable unit (only one unit shown for simplicity). That is, one side of the stationary unit has an uneven shape, and the first portion 1010 and the third portion 1030 are placed on respective protruding portions. Furthermore, an electric wire portion 1020 electrically connecting the first portion 1010 and the third portion 1030 is provided on one lateral side of the stationary unit. The electric wire portion may have any shape as long as it can electrically connect the first portion 1010 and the third portion 1030.

In a similar way, an electric wire portion 1040 electrically connecting the third portion 1030 and a first portion 1010 of a succeeding pattern is provided on the other side of the stationary (or movable) unit, which is illustrated in phantom line as being on the rear edge of the unit.

As set forth above, patterns provided on the movable gauges 850 preferably have substantially the same shape as those of the stationary gauge 800.

FIG. 13 is a side cross-sectional view showing a manner in which the stationary gauge 800 and the movable gauge 850 can be mutually coupled. The stationary unit and the movable unit are arranged so that the respective protruding portions face one another.

Here, the protruding portions of the stationary gauge 800 and the movable gauge 850 can be geared with one another. In this arrangement, the movable gauge 850 should be movable within a range of about half (½) the pitch between the patterns of the stationary gauge in order to prevent damage.

In general, the magnitude of an induced voltage is in inverse proportion to the distance between the patterns of the stationary gauge and the movable gauge. Thus, if a gap between the two patterns could be removed, the linearity of an induced voltage can be guaranteed, and in this manner the accuracy of an output value can be improved.

According to the embodiment of FIG. 12, because the first portion 1010 and the third portion 1030 of the stationary gauge and the corresponding first and third portions of the movable gauge are, in use, substantially coplanar, the influence of a gap (i.e., a factor hindering the linearity of an induced voltage) is thus reduced.

Furthermore, the influence of the connecting portions (e.g. 1020, 1040) between the patterns can be minimized by providing the connecting portions on lateral edges of each member, as illustrated in FIG. 12. Furthermore, in comparison with embodiments where connecting portions are provided so as to penetrate each respective member, there is an advantage in the foregoing lateral edge placement, in that electromotive force (EMF) caused by eddy currents occurring in the through-hole portions, is avoided.

FIG. 14 is provided to illustrate only the electric wires of the embodiment of FIG. 13, for clarity, to facilitate understanding of the three-dimensional configuration of the electric wires.

Hereinafter, the principle of operation of load measuring transducers according to the present invention is described. Each gauge is described with reference to the conceptual view shown in FIG. 6 not the embodiment shown in FIG. 10, for convenience of description.

Figure 2:
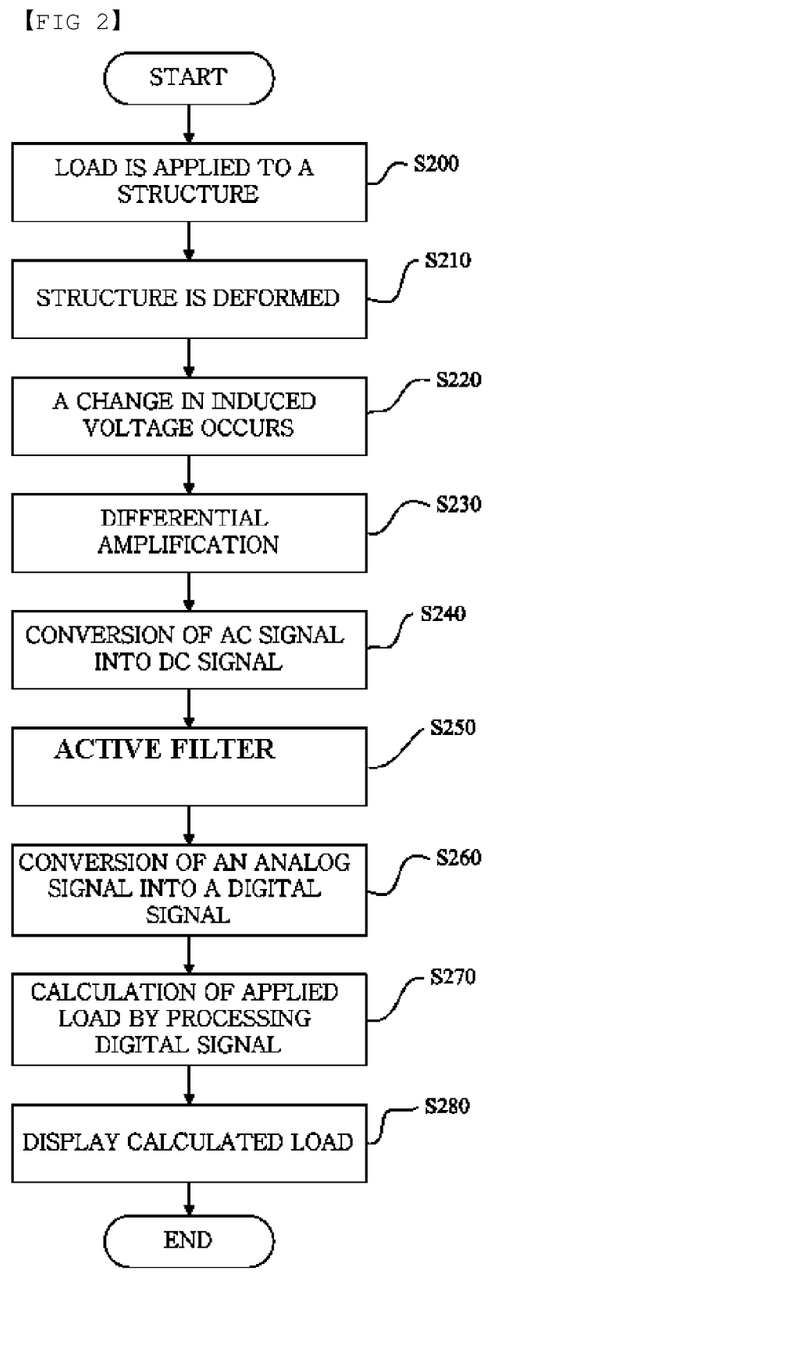
FIG. 2 is a flowchart illustrating a load measuring method according to the present invention, suitable for use with gauges of the present invention.
Figure 3A:
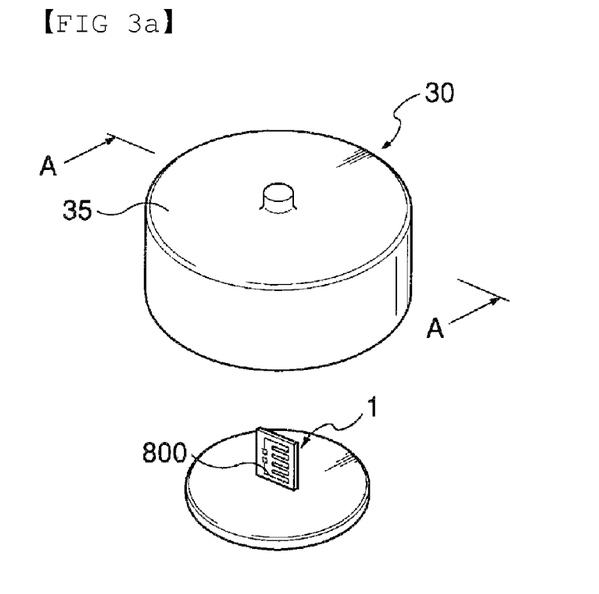
FIGS. 3a and 3b are exploded perspective views of load-measuring transducers, suitable for use with gauges of the present invention.
Figure 3B:
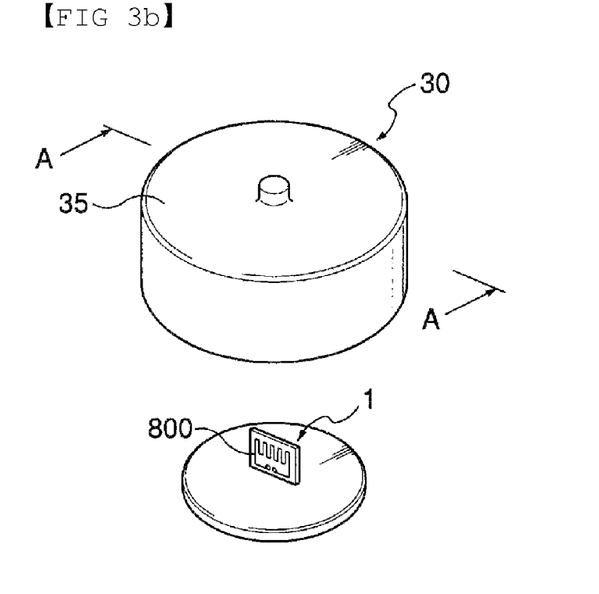

When an elastic deformation is produced in a structure, the movable gauge 850 of an IPPA gauge 1 is moved in its deformation direction (indicated by 'A' in FIG. 6). When the movable gauge 850 is moved relative to the stationary gauge 800 in such a manner, induced voltage is generated between the ends of the movable gauge 850 and the generated voltage signal is applied to and amplified by an amplifier 11, as illustrated in FIGS. 1 and 2. The amplifier 11 is chiefly an operational amplifier that preferably performs differential amplification.

Meanwhile, according to the present invention, the movable gauge 850 may be moved in a direction perpendicular to the longitudinal direction of the gauge (a direction perpendicular to the direction 'A' in FIG. 6). According to the present invention, even though the movable gauge 850 is moved in a direction perpendicular to the longitudinal direction of the gauge, there is an advantage in that load can still be measured without meaningful limitation on the lateral movement.

Figure 4A:
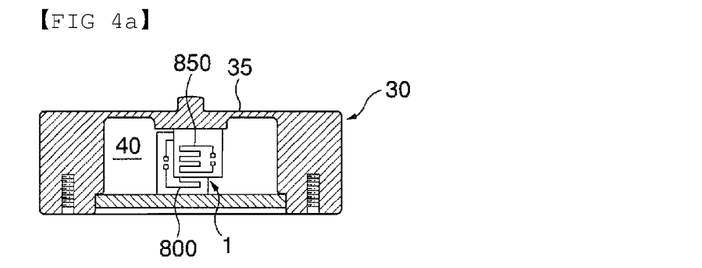
FIGS. 4a and 4b are sectional views of a transducer, suitable for use with gauges of the present invention.
Figure 4B:
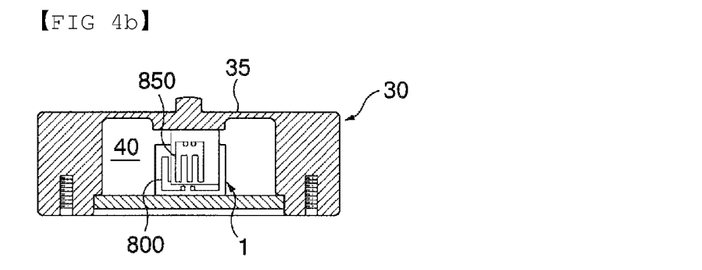
Figure 5:
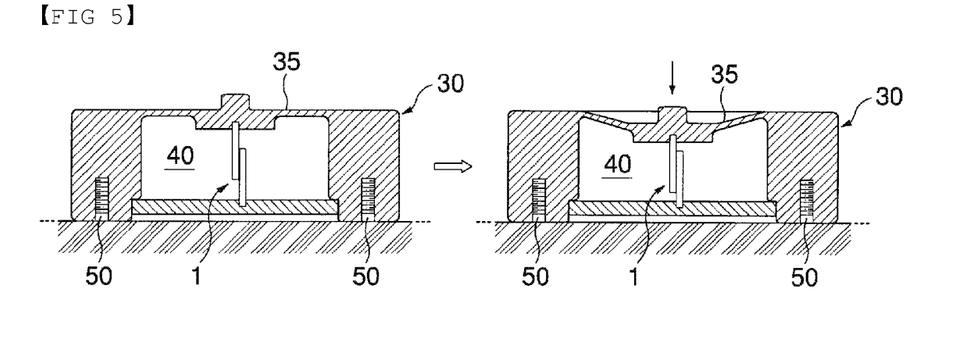
FIG. 5 illustrates sectional views of structures with which the load measuring transducer of FIG. 3 is employed, and which is suitable for use with gauges of the present invention.

FIG. 4a is sectional view showing a case where the IPPA gauge 1 according to an embodiment in which the movable gauge 850 is moved in a longitudinal direction of the gauge as shown in FIG. 10, and is mounted in the structure 30. FIG. 4b is a sectional view showing a state the IPPA gauge 1 according to another embodiment in which the movable gauge 850 is moved in a direction perpendicular to the longitudinal direction in the gauge as shown in FIG. 12, and is mounted in the structure. In the above two embodiments, the movable gauge 850 is moved depending on deformation of a deformation-producing portion 35, which is produced when load is applied to the structure 30. Then, a value of induced voltage generated in the movable gauge is measured. Therefore, the applied load can be measured.

Figure 11:
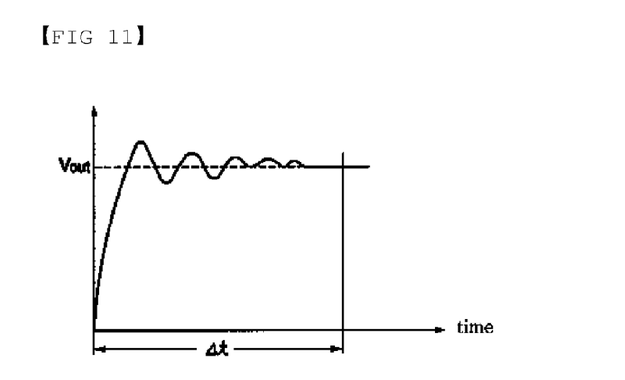
FIG. 11 is a graph conceptually showing changes in an output induced voltage, caused by the application of load, when load measuring transducers of the present invention are operated.

FIG. 11 shows a graph of the output voltage induced at the movable gauge 850 versus time in a general case where load is applied to the structure. As shown in the graph of FIG. 11, the magnitude of the voltage induced at the movable gauge 850 slightly fluctuates and then converges to a certain value. To measure the converged voltage value, it is preferred to measure a voltage, Vout, after a lapse of a predetermined period of time Δt (delta t).

The electric signal that is induced at the IPPA gauge 1 and then amplified by the amplifier 11 is an AC signal. The AC signal is preferably used directly. However, an AC/DC converter 12 may be further provided for converting the AC signal into a DC signal, if appropriate. The electric signal converted into the DC signal passes through an active filter 13 so that electrical noise or surge signals can be removed and filtered out and an effective optimal signal is thus obtained.

The electrical signal provided through the amplifier 11 is then converted into a digital signal by the A/D converter 14. The obtained digital signal is finally input into a calculation unit 15 that in turn calculates the magnitude of load applied to a structure 30 from the digital signal based on the voltage signal induced at the movable gauge 850.

It is preferred that the calculation unit 15 be implemented with a microprocessor. The calculated magnitude of load can be displayed on a display device. In addition, conventional input means may be used to input configuration values, setup information, and factors, communication messages, timer parameters or the like into the microprocessor.

FIG. 2 is a flowchart illustrating a load measuring method according to the present invention.

When load is applied to a structure (step S200), the structure is then deformed (step S210). The displacement of the movable gauge 850 in the IPPA gauge 1 occurs depending on the amount of deformation of the structure. This causes a change in an induced voltage at the movable gauge 850 due to its relationship with the stationary gauge 800 (step S220).

AC electricity generated by the oscillator unit 31 is applied to the stationary gauge 800 of the IPPA gauge 1 by the AC electricity-applying unit 33. Upon elastic deformation in the structure, the movable gauge 850 is displaced with respect to the stationary gauge 800 without contact, resulting in a change in the induced voltage due to an electromagnetic induction phenomenon.

The obtained value of the change in the induced voltage is differentially amplified by the amplifier 11 (step S230). Thereafter, the conversion of an AC signal into a DC signal is performed, if necessary (step S240). Then, any electric noises and any surge signals are filtered out (step S250), the conversion of an analogue signal into a digital signal is performed (step S260), and the digital signal is processed to accurately calculate the applied load by the calculation unit, i.e. microprocessor 15 (step S270). The processed signal, i.e. load, is displayed on the display (step S280).

The microprocessor 15 performs signal processing and calculation, and compensation operations such as key input, storage of setup information and factors, communications and input of time. The communications may be made by properly configuring a unidirectional or bidirectional communication scheme.

FIGS. 3a to 5 show the most basic embodiments in which the structure 30, a cylindrical member, is formed with a hollow portion 40 therein, wherein an upper part of the structure 30 comprises a deformation-producing portion 35 including a central axis (vertical axis).

It is preferred that the structure 30 includes a projection at the center of the deformation-producing portion 35 so that load can be applied directly to the projection. The deformation-producing portion 35 is a portion that is deformed to produce deformation in proportion to load applied thereto. The amount of deformation of the deformation-producing portion 35 is transferred to the movable gauge 850 of the IPPA gauge. The movement of the movable gauge 850 generates an induced voltage to be output. The induced voltage is processed through the aforementioned procedure and thus the applied load is obtained.

The structure 30 may have a detachable bottom portion 45. When the bottom portion 45 of the structure 30 is constructed as such, a hollow portion 40 can be isolated from the outside.

The deformation-producing portion 35 is a thin elastic body which is preferably constructed such that a central portion thereof protrudes with respect to a peripheral portion thereof to facilitate the occurrence of the deformation due to the applied load.

The IPPA gauge 1 converts the amount of deformation, which is produced due to the elastic deformation of the structure, into the amount of change in the induced voltage corresponding thereto and then outputs the amount of change. The movable gauge 850 is mounted on the bottom surface of the deformation-producing portion 35 of the structure 30, and the stationary gauge 800 is placed to face the movable gauge 850 and fixed to the bottom portion 45.

If the movable gauge 850 mounted on the bottom surface of deformation-producing portion 35 of the structure 30 is moved downward due to the deformation of the deformation-producing portion 35, induction effects between the movable gauge and the stationary gauge 800 to which the AC electricity is applied result in a changed induced voltage, Vout, at the movable gauge 850.

Here, the movable gauge 850 of the IPPA gauge 1 is connected to a circuit including the amplifier 11 and the like, and the output induced voltage Vout signal is processed through the aforementioned procedure. Therefore, the applied load is calculated based on the processing and then displayed.

According to the present invention, the load applied to the deformation-producing portion 35 can be transferred, without any distortion of the load, directly to the IPPA gauge 1, used as a conversion means. Further, because the output induced voltage can be increased by increasing an AC frequency of the oscillator unit 31, it is possible to remarkably enhance load measurement accuracy as compared with conventional load cells.

To this end, it is preferred that among the two flat plates constituting the IPPA gauge 1, the upper flat plate formed with the movable gauge 850 be arranged to be aligned with the central axis of the deformation-producing portion 35 of the structure and the other lower flat plate formed with the stationary gauge 800 be arranged in parallel to the upper flat plate.

In such a configuration, vertical load (designated by an arrow in the figures) applied to the center of the deformation-producing portion 35 can be accurately transferred directly to the IPPA gauge 1. Thus, based on the transferred deformation, the IPPA gauge 1 can obtain an accurate induced voltage corresponding to the amount of elastic deformation of the structure 30 due to the load applied thereto, i.e. the amount of deformation of the deformation-producing portion 35. Particularly, according to the present invention, it is possible to essentially prevent distortion phenomena from occurring when the deformation, and resultant deformation of the deformation-producing portion 35 occur. Therefore, the problems in the prior art are avoided.

Further, one advantage of the present invention is to provide simply constructed mechanisms for load detection. Thus, the present invention is more advantageous than the prior art in view of accuracy, as well as costs and simplicity of fabrication. Moreover, since the present invention easily overcomes vulnerability to heavier load or impact, the present invention can be widely used as simple scales and reliable load measuring systems in a variety of outdoor industrial sites.

While the present invention has been described with reference to particular illustrative embodiments, it is not to be restricted by the embodiments but only by the appended claims. It is to be appreciated that those skilled in the art can change or modify the embodiments without departing from the scope or spirit of the present invention.

INDUSTRIAL APPLICABILITY

According to the subject load measuring systems, load measuring transducers and load measuring methods of the present invention, an applied load can be measured either in real time by inducing elastic deformation in a structure due to an applied load and by continuously measuring an accurate induced voltage corresponding to that elastic deformation. Such measurements can be performed without any distortion using simple components, independent of a motion paths, by measuring the induced voltages, in some cases after a predetermined period of time lapses. In this manner, the following advantages can be obtained.

First, in accordance with the invention elements of the prior art that disturb or distort behavior of the structure, which are not uniform and which cannot be correctly predicted, are essentially eliminated, resulting in higher accuracies.

Second, since simplified structures and components are employed, another advantage is that low production costs can be achieved.

Third, there is a further advantage in that the present invention can be variously applied within a wide range of light load to heavy load (above several tons) applications, according to the capacities of the precise structure and gauge design.

Fourth, because a transducer that operates relatively well under severe conditions or environments, in which external impact is produced, for example, can be implemented according to the structures of the present invention, there is a still further advantage in that the present invention can be used as a reliable load measuring system in a variety of outdoor industrial fields.

Fifth, because transducers in accordance with the present invention can be embodied in various sizes, including very small sizes, there is a still further advantage in that the present invention can be widely applied to various fields.

Sixth, according to the present invention, compared with designs of the prior art, portions producing errors are structurally modified, essentially removing them from electric wire patterns producing induced voltage. Accordingly, there are advantages in that error correction processes of the prior art can be omitted and measurement accuracy can be increased.

What is claimed is:

1. A load measuring transducer for measuring load applied to a structure, the structure including a deformation-producing portion configured to produce elastic deformation when a load is applied to the structure, the load measuring transducer comprising:

a stationary gauge having electric wire patterns with a predetermined pitch formed thereon, the wire pattern repeating a predetermined number of times, and configured and adapted to receive application of AC electricity;

a stationary unit having the stationary gauge formed therein;

a movable gauge configured to move in a longitudinal direction with respect to the stationary gauge without coming into contact with the stationary gauge, in response to elastic deformation produced in the deformation-producing portion, the movable gauge also having electric wire patterns with a predetermined pitch formed thereon, the wire pattern repeating a predetermined number of times; and a movable unit having the movable gauge formed therein, wherein each of the electric wire patterns of the stationary gauge comprises a first portion configured to extend in a straight line on a first surface of the stationary unit, a second portion configured to extend from the first portion and penetrate the stationary unit, a third portion configured to extend from the second portion and provided on a second surface of the stationary unit in a direction perpendicular to the first portion, a fourth portion configured to extend from the third portion and penetrate the stationary unit, a fifth portion configured to extend from the fourth portion and provided in a straight line on the first surface of the stationary unit in parallel to the first portion, a sixth portion configured to extend from the fifth portion and penetrate the stationary unit, a seventh portion configured to extend from the sixth portion and provided on the second surface of the stationary unit in a direction perpendicular to the fifth portion, and an eighth portion configured to extend from the seventh portion and penetrate the stationary unit, and wherein each of the electric wire patterns of the movable gauge comprises a first portion configured to extend in a straight line on a first surface of the movable unit, a second portion configured to extend from the first portion and penetrate the movable unit, a third portion configured to extend from the second portion and provided on a second surface of the movable unit in a direction perpendicular to the first portion, a fourth portion configured to extend from the third portion and penetrate the movable unit, a fifth portion configured to extend from the fourth portion and provided in a straight line on the first surface of the movable unit in parallel to the first portion, a sixth portion configured to extend from the fifth portion and penetrate the movable unit, a seventh portion configured to extend from the sixth portion and provided on the second surface of the movable unit in a direction perpendicular to the fifth portion, and an eighth portion configured to extend from the seventh portion and penetrate the movable unit.

2. A load measuring system for measuring load applied to a structure including a deformation-producing portion configured to exhibit elastic deformation when the load is applied to the structure, the load measuring system comprising:

a load measuring transducer, comprising a stationary gauge configured to have electric wire patterns with a predetermined pitch formed thereon, the wire patterns repeating a predetermined number of times and both ends configured and adapted to receive application of AC electricity, a stationary unit having the stationary gauge formed therein, a movable gauge configured to move in a longitudinal direction of the stationary gauge without coming into contact with the stationary gauge in response to elastic deformation produced in the deformation-producing portion and to have electric wire patterns with a predetermined pitch formed thereon, the wire patterns repeating a predetermined number of times, and a movable unit having the movable gauge formed therein; and a calculation unit calculating a magnitude of the applied load based on an amount of induced voltage output from the movable gauge of the transducer, wherein each of the electric wire patterns of the stationary gauge comprises a first portion configured to extend in a straight line on a first surface of the stationary unit, a second portion configured to extend from the first portion and penetrate the stationary unit, a third portion configured to extend from the second portion and provided on a second surface of the stationary unit in a direction perpendicular to the first portion, a fourth portion configured to extend from the third portion and penetrate the stationary unit, a fifth portion configured to extend from the fourth portion and provided in a straight line on the first surface of the stationary unit in parallel to the first portion, a sixth portion configured to extend from the fifth portion and penetrate the stationary unit, a seventh portion configured to extend from the sixth portion and provided on the second surface of the stationary unit in a direction perpendicular to the fifth portion, and an eighth portion configured to extend from the seventh portion and penetrate the stationary unit, and wherein each of the electric wire patterns of the movable gauge comprises a first portion configured to extend in a straight line on a first surface of the movable unit, a second portion configured to extend from the first portion and penetrate the movable unit, a third portion configured to extend from the second portion and provided on a second surface of the movable unit in a direction perpendicular to the first portion, a fourth portion configured to extend from the third portion and penetrate the movable unit, a fifth portion configured to extend from the fourth portion and provided in a straight line on the first surface of the movable unit in parallel to the first portion, a sixth portion configured to extend from the fifth portion and penetrate the movable unit, a seventh portion configured to extend from the sixth portion and provided on the second surface of the movable unit in a direction perpendicular to the fifth portion, and an eighth portion configured to extend from the seventh portion and penetrate the movable unit.

3. The load measuring transducer as claimed in claim 1, wherein the applied load is measured based on an amount of induced voltage measured from the movable gauge.

4. The load measuring transducer as claimed in claim 1, wherein:
   the third portion of the pattern is provided in a direction perpendicular to the first portion, the second portion, the fourth portion, and the fifth portion, and
   the seventh portion of the pattern is provided in a direction perpendicular to the first portion, the sixth portion, the eighth portion, and the fifth portion.

5. The load measuring transducer as claimed in claim 1, wherein electronic elements are coupled to the third portion or the seventh portion.

6. The load measuring transducer as claimed in claim 1, wherein the movable gauge is movable within a range of about ¼ of a pitch between the patterns of the stationary gauge.

7. The load measuring transducer as claimed in claim 1, wherein the stationary unit or the movable unit is made of materials capable of shielding an electric field.

8. A load measuring transducer for measuring load applied to a structure including a deformation-producing portion configured to produce elastic deformation when the load is applied to the structure, the load measuring transducer comprising:
   a stationary gauge configured to have electric wire patterns with a predetermined pitch formed thereon, the electric wire patterns repeating a predetermined number of times and configured and adapted to receive application of AC electricity;
   a stationary unit having the stationary gauge formed therein;
   a movable gauge configured to move in a longitudinal direction of the stationary gauge without coming into contact with the stationary gauge in response to elastic deformation produced in the deformation-producing portion and to have electric wire patterns with a predetermined pitch formed thereon, the electric wire patterns repeating a predetermined number of times; and
   a movable unit having the movable gauge formed therein,
   wherein each of the electric wire patterns of the stationary gauge comprises a first portion configured to protrude from one side of the stationary unit and provided in a straight line; a third portion configured to protrude from the one side of the stationary unit in parallel to the first portion and provided in a straight line; a second portion provided on the one side of the stationary unit and configured to electrically connect the first portion and the third portion; and a fourth portion provided on an other side of the stationary unit and configured to electrically connect the third portion and a first portion of a next repeated pattern, and
   wherein each of the electric wire patterns of the movable gauge comprises a first portion configured to protrude from one side of the stationary unit and provided in a straight line; a third portion configured to protrude from the one side of the stationary unit in parallel to the first portion and provided in a straight line; a second portion provided on the one side of the stationary unit and configured to electrically connect the first portion and the third portion; and a fourth portion provided on an other side of the stationary unit and configured to electrically connect the third portion and a first portion of a next repeated pattern.

9. The load measuring transducer as claimed in claim 8, wherein:
   the stationary unit and the movable unit are mutually arranged such that respective protruding portions facing each other, and
   the first and third portions of the patterns of the stationary gauge are arranged substantially coplanar with the first and third portions of the patterns of the movable gauge.

* * * * *